US012572063B2

(12) United States Patent
Morikuni

(10) Patent No.: US 12,572,063 B2
(45) Date of Patent: Mar. 10, 2026

(54) OPTICAL SYSTEM AND PROJECTOR

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 557 days.

(21) Appl. No.: 18/076,816

(22) Filed: Dec. 7, 2022

(65) Prior Publication Data

US 2023/0176465 A1 Jun. 8, 2023

(30) Foreign Application Priority Data

Dec. 8, 2021 (JP) ................................. 2021-199083

(51) Int. Cl.
G03B 21/28 (2006.01)
G02B 17/08 (2006.01)
(52) U.S. Cl.
CPC ......... G03B 21/28 (2013.01); G02B 17/0828 (2013.01); G02B 17/0856 (2013.01)
(58) Field of Classification Search
CPC .... G03B 21/28; G03B 21/14; G03B 21/2066; G02B 17/0828; G02B 17/0856; G02B 13/0065
USPC ........................................................ 353/99
See application file for complete search history.

(56) References Cited

U.S. PATENT DOCUMENTS

| | | |
|---|---|---|
| 2002/0018289 A1 | 2/2002 | Nanba et al. |
| 2011/0164311 A1 | 7/2011 | Morikuni |
| 2013/0070217 A1 | 3/2013 | Tatsuno |
| 2019/0011684 A1 | 1/2019 | Ishihara et al. |
| 2021/0231932 A1* | 7/2021 | Morikuni ........... G02B 17/0856 |
| 2021/0232027 A1* | 7/2021 | Yanagisawa ......... G03B 21/142 |
| 2021/0232033 A1* | 7/2021 | Yanagisawa .......... G02B 17/08 |
| 2021/0232034 A1* | 7/2021 | Morikuni .............. G03B 21/28 |
| 2022/0066180 A1* | 3/2022 | Yanagisawa ....... G02B 17/0856 |
| 2022/0066296 A1* | 3/2022 | Yanagisawa ......... G02B 17/086 |

FOREIGN PATENT DOCUMENTS

| | | |
|---|---|---|
| JP | H09-258106 A | 10/1997 |
| JP | 2011-138086 A | 7/2011 |
| JP | 2013-064816 A | 4/2013 |
| JP | 2017-156714 A | 9/2017 |
| JP | 2021-117276 A | 8/2021 |

* cited by examiner

*Primary Examiner* — Magda Cruz
(74) *Attorney, Agent, or Firm* — Oliff PLC

(57) ABSTRACT

An optical system includes a first optical element. The first optical element has a first transmission surface, a first reflecting surface arranged at a reduction side of the first transmission surface, and a second transmission surface arranged at the reduction side of the first reflecting surface. The first transmission surface has power. Light passing between the first transmission surface and the first reflecting surface includes peripheral light tilted in a direction of getting away from an enlargement-side conjugated plane as coming closer to the first transmission surface. The peripheral light is tilted in a direction of coming closer to the enlargement-side conjugated plane as getting away from the first transmission surface between the first transmission surface and the enlargement-side conjugated plane.

15 Claims, 11 Drawing Sheets

250.00 MM

FIELD
POSITION 0.00,  1.00
0.000, -15.2 MM 0.00,  0.77
0.000, -11.7 MM 0.00,  0.55
0.000, -8.28 MM 0.00,  0.32
0.000, -4.83 MM 0.00,  0.09
0.000, -1.38 MM 5.00    MM

DEFOCUSING                  0.00000

300.00 MM

FIELD
POSITION 0.00, 1.00
0.000, -18.8 MM 0.00, 0.81
0.000, -15.3 MM 0.00, 0.63
0.000, -11.8 MM 0.00, 0.44
0.000, -8.34 MM 0.00, 0.26
0.000, -4.86 MM 0.00, 0.07
0.000, -1.38 MM 5.00    MM

DEFOCUSING                    0.00000

OPTICAL SYSTEM AND PROJECTOR

The present application is based on, and claims priority from JP Application Serial Number 2021-199083, filed Dec. 8, 2021, the disclosure of which is hereby incorporated by reference herein in its entirety.

BACKGROUND

1. Technical Field

The present disclosure relates to an optical system and a projector.

2. Related Art

A projection optical system provided with an optical element having an exit surface, a reflecting surface, and a plane of incidence is described in JP-A-2017-156714 (Document 1). In the projection optical system of Document 1, the plane of incidence of the optical element coincides with a reduction-side conjugated plane. Therefore, when installing such a projection optical system in a projector, a spatial modulator such as a liquid crystal panel is installed on the plane of incidence of the optical element. The exit surface of the optical element is a spherical surface having a convex shape protruding toward an enlargement-side conjugated plane, and is directly opposed to a screen installed on the enlargement-side conjugated plane. The reflecting surface of the optical element is located at an opposite side to the enlargement-side conjugated plane across the exit surface and the plane of incidence in an optical axis direction of the projection optical system. The reflecting surface is provided with a concave shape recessed in a direction of getting away from the enlargement-side conjugated plane in the optical axis direction.

The optical element in Document 1 is obtained by bonding a first optical element and a second optical element arranged in the optical axis direction. The first optical element is provided with the exit surface, and the second optical element is provided with the plane of incidence and the reflecting surface. In the first optical element, an area facing to the screen side corresponds to the exit surface. In the second optical element, in an area facing to the opposite side to the screen, there is formed a reflecting film. Such a reflecting film forms the reflecting surface. Inside the optical element, projection light proceeding from the reflecting surface toward the exit surface passes through a bonded surface on which the first optical element and the second optical element are bonded to each other. The bonded surface is disposed so as to be perpendicular to the optical axis.

On the bonded surface, there is disposed an aperture diaphragm. The projection light which has entered the plane of incidence of the optical element from the spatial modulator side, and has been folded by the reflecting surface passes through the aperture diaphragm, and is then emitted from the exit surface to reach the screen. When the projection light passes through the aperture diaphragm, a part of the projection light is blocked by a light blocking part of the aperture diaphragm.

In the projection optical system of Document 1, since the optical element is provided with the aperture diaphragm, the most peripheral light beam of the projection light becomes thinner compared to the light beam in the vicinity of the center thereof. Therefore, the periphery of the enlarged image to be projected on the screen becomes dark.

Here, when making the aperture diameter of the aperture diaphragm larger, it becomes possible to ensure an amount of light in the periphery of the enlarged image. However, when making the aperture diameter of the aperture diaphragm excessively large, the projection light runs off the area facing to the screen side in the first optical element, and thus, it becomes unachievable for the peripheral light of the projection light to reach the screen. Therefore, even when making the aperture diameter of the aperture diaphragm larger, there is a limitation in ensuring the amount of light in the periphery of the enlarged image.

SUMMARY

In view of the problems described above, an optical system according to the present disclosure includes a first optical element. The first optical element has a first transmission surface, a first reflecting surface arranged at a reduction side of the first transmission surface, and a second transmission surface arranged at the reduction side of the first reflecting surface. The first transmission surface has power. Light passing between the first transmission surface and the first reflecting surface includes peripheral light tilted in a direction of getting away from an enlargement-side conjugated plane as coming closer to the first transmission surface. The peripheral light is tilted in a direction of coming closer to the enlargement-side conjugated plane as getting away from the first transmission surface between the first transmission surface and the enlargement-side conjugated plane.

Further, an optical system according to another aspect of the present disclosure includes a first optical element and a lens arranged at an enlargement side of the first optical element. The first optical element has a first transmission surface, a first reflecting surface arranged at a reduction side of the first transmission surface, and a second transmission surface arranged at the reduction side of the first reflecting surface. The first transmission surface has power. Light passing between the first transmission surface and the first reflecting surface includes peripheral light tilted in a direction of getting away from an enlargement-side conjugated plane as coming closer to the first transmission surface. The peripheral light is tilted in a direction of getting away from the enlargement-side conjugated plane as getting away from the first transmission surface between the first transmission surface and the lens. The peripheral light is tilted in a direction of coming closer to the enlargement-side conjugated plane as getting away from the lens between the lens and the enlargement-side conjugated plane.

Then, a projector according to the present disclosure includes a light modulator arranged on reduction-side conjugated plane and configured to modulate light emitted from a light source, and the optical device described above which is configured to project the light modulated by the light modulator.

DESCRIPTION OF EXEMPLARY EMBODIMENTS

An optical system and a projector according to some embodiments of the present disclosure will hereinafter be described with reference to the drawings.

Projector

Figure 1:
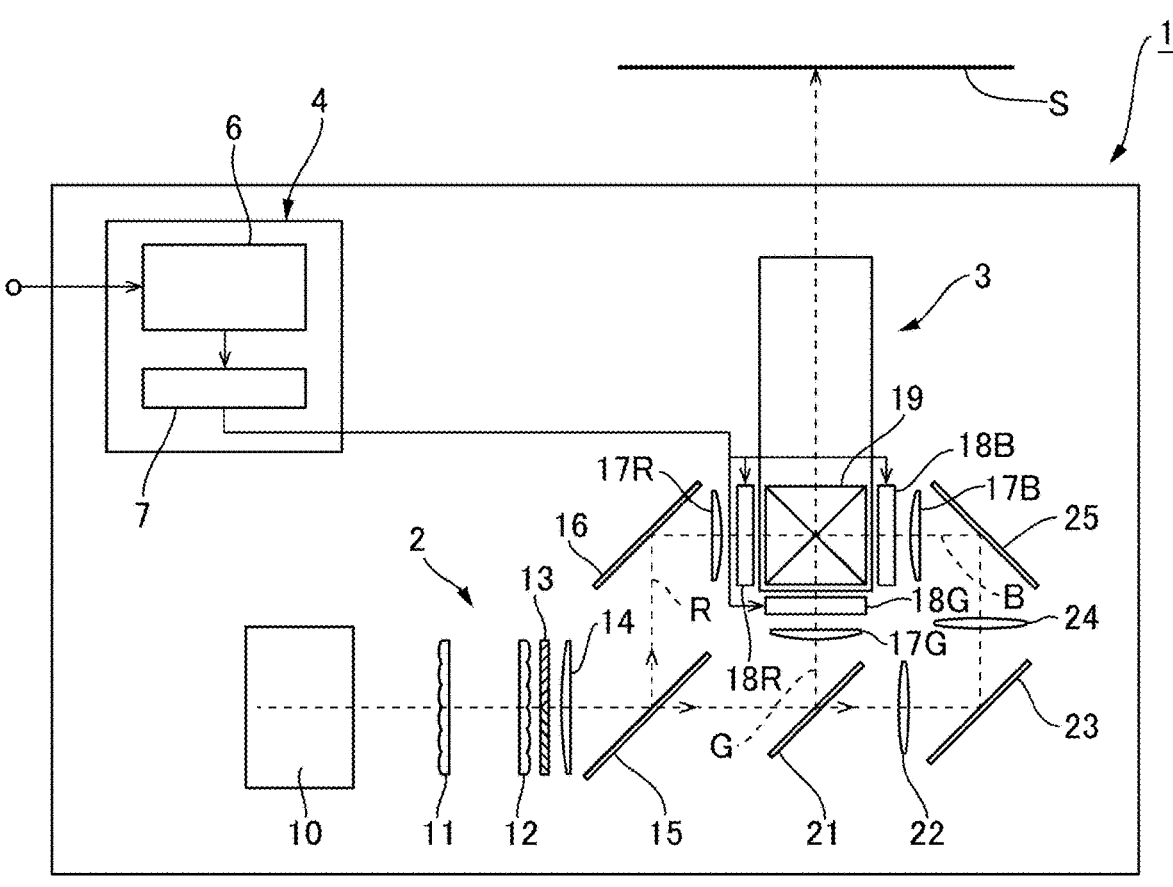
FIG. 1 is a diagram showing a schematic configuration of a projector equipped with an optical system according to the present disclosure.

FIG. 1 is a diagram showing a schematic configuration of a projector equipped with an optical system 3 according to the present disclosure. As shown in FIG. 1, the projector 1 is provided with an image formation section 2 for generating a projection image to be projected on a screen S, the optical system 3 for enlarging the projection image to project an enlarged image on the screen S, and a control section 4 for controlling an operation of the image formation section 2.

Image Formation Section and Control Section

The image formation section 2 is provided with a light source 10, a first integrator lens 11, a second integrator lens 12, a polarization conversion element 13, and a superimposing lens 14. The light source 10 is formed of, for example, a super-high pressure mercury lamp or a solid-state light source. The first integrator lens 11 and the second integrator lens 12 each have a plurality of lens elements arranged in an array. The first integrator lens 11 divides a light beam from the light source 10 into a plurality of light beams. Each of the lens elements of the first integrator lens 11 converges the light beam from the light source 10 in the vicinity of the corresponding one of the lens elements of the second integrator lens 12.

The polarization conversion element 13 converts the light from the second integrator lens 12 into predetermined linearly polarized light. The superimposing lens 14 superimposes the images of the respective lens elements of the first integrator lens 11 on the display area of each of a liquid crystal panel 18R, a liquid crystal panel 18G, and a liquid crystal panel 18B described later via the second integrator lens 12.

Further, the image formation section 2 is provided with a first dichroic mirror 15, a reflecting mirror 16 and a field lens 17R, and the liquid crystal panel 18R. The first dichroic mirror 15 reflects R light as a part of the light having entered the first dichroic mirror 15 from the superimposing lens 14, and transmits G light and B light each of which is a part of the light having entered the first dichroic mirror 15 from the superimposing lens 14. The R light having been reflected by the first dichroic mirror 15 enters the liquid crystal panel 18R via the reflecting mirror 16 and the field lens 17R. The liquid crystal panel 18R is a light modulation element. The liquid crystal panel 18R modulates the R light in accordance with an image signal to thereby form a red projection image.

Further, the image formation section 2 is provided with a second dichroic mirror 21, a field lens 17G, and the liquid crystal panel 18G. The second dichroic mirror 21 reflects the G light as a part of the light from the first dichroic mirror 15, and transmits the B light as a part of the light from the first dichroic mirror 15. The G light having been reflected by the second dichroic mirror 21 enters the liquid crystal panel 18G via the field lens 17G. The liquid crystal panel 18G is a light modulation element. The liquid crystal panel 18G modulates the G light in accordance with the image signal to thereby form a green projection image.

Further, the image formation section 2 is provided with a relay lens 22, a reflecting mirror 23, a relay lens 24, a reflecting mirror 25 and a field lens 17B, and the liquid crystal panel 18B and a cross dichroic prism 19. The B light having been transmitted through the second dichroic mirror 21 enters the liquid crystal panel 18B via the relay lens 22, the reflecting mirror 23, the relay lens 24, the reflecting mirror 25, and the field lens 17B. The liquid crystal panel 18B is a light modulation element. The liquid crystal panel 18B modulates the B light in accordance with the image signal to thereby form a blue projection image.

The liquid crystal panel 18R, the liquid crystal panel 18G, and the liquid crystal panel 18B surround the cross dichroic prism 19 from three directions. The cross dichroic prism 19 is a light combining prism, and generates the projection image obtained by combining the light beams modulated by the respective liquid crystal panels 18R, 18G, and 18B with each other.

The optical system 3 projects the projection image combined by the cross dichroic prism 19 in an enlarged manner.

The control section 4 is provided with an image processing section 6 to which an external image signal such as a video signal is input, and a display drive section 7 for driving the liquid crystal panel 18R, the liquid crystal panel 18G, and the liquid crystal panel 18B based on the image signals output from the image processing section 6.

The image processing section 6 converts the image signal input from external equipment into image signals including the tones and so on of the respective colors. The display drive section 7 makes the liquid crystal panel 18R, the liquid crystal panel 18G, and the liquid crystal panel 18B operate based on the projection image signals of the respective colors output from the image processing section 6. Thus, the image processing section 6 displays the projection images corresponding to the image signals on the liquid crystal panel 18R, the liquid crystal panel 18G, and the liquid crystal panel 18B, respectively.

Practical Example 1

Figure 2:
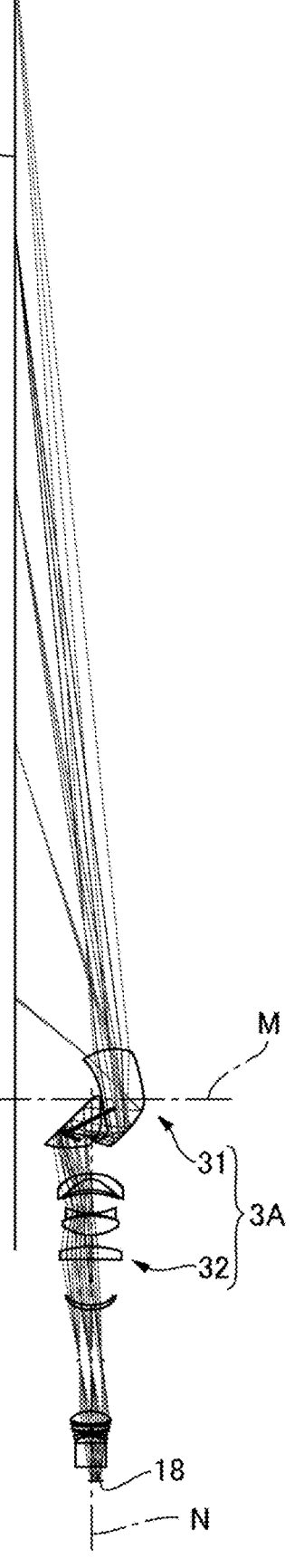
FIG. 2 is a ray chart schematically showing a whole of an optical system according to Practical Example 1.
Figure 3:
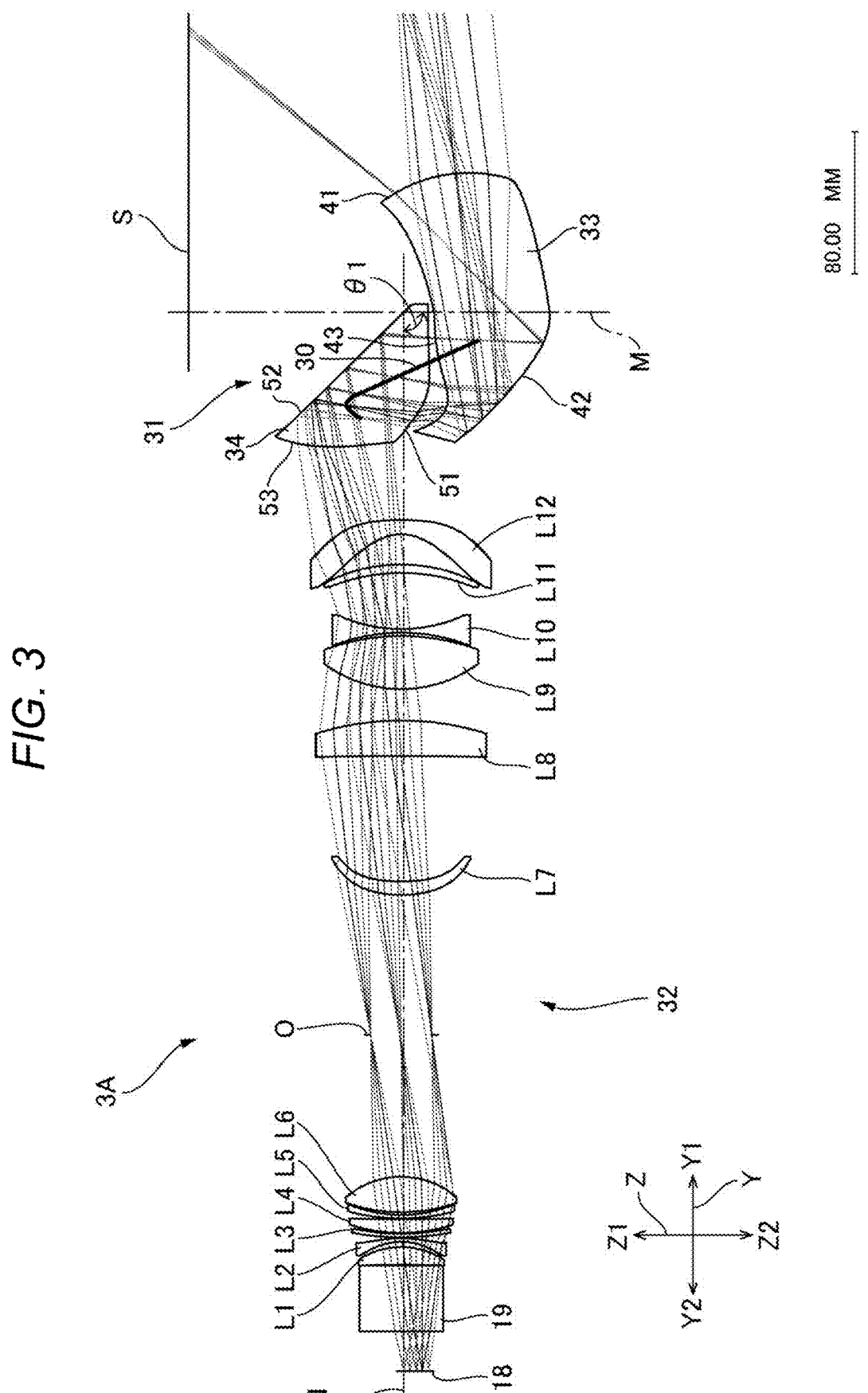
FIG. 3 is a ray chart of the optical system according to Practical Example 1.
Figure 4:
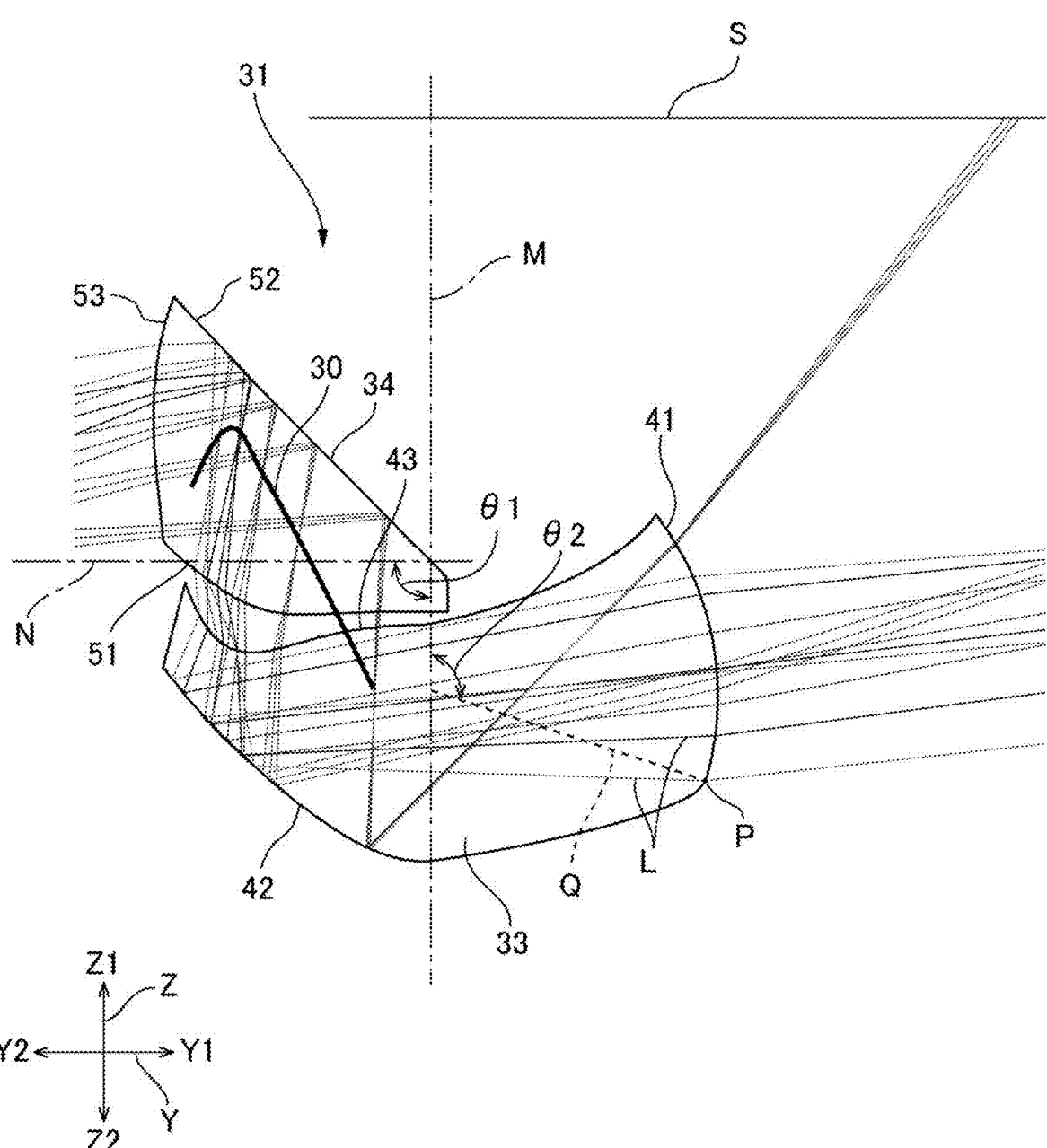
FIG. 4 is a ray chart of a first optical system in Practical Example 1.

FIG. 2 is a ray chart schematically showing a whole of an optical system according to Practical Example 1. FIG. 3 is a ray chart of the optical system 3A according to Practical Example 1. FIG. 4 is a ray chart of a first optical system in Practical Example 1. As shown in FIG. 2 and FIG. 3, on a reduction-side conjugated plane of the optical system 3A, there is disposed the liquid crystal panel 18.

In the following description, three axes perpendicular to each other are defined as an X axis, a Y axis, and a Z axis for the sake of convenience. Further, a width direction of the screen S as the enlargement-side conjugated plane is defined as an X-axis direction, a vertical direction of the screen S is defined as a Y-axis direction, and a direction perpendicular to the screen S is defined as a Z-axis direction. In the Y-axis direction, an upper side of the screen S is defined as a Y1 direction, and a lower side of the screen S is defined as a Y2 direction. In the Z-axis direction, a side at which the screen S is located is defined as a Z1 direction, and an opposite side to the Z1 direction is defined as a Z2 direction.

As shown in FIG. 2, the optical system 3A according to the present example has a first optical system 31 and a second optical system 32 disposed in sequence from an enlargement side toward a reduction side. The first optical system 31 is a reflective optical system. An optical axis M of the first optical system 31 extends along the Z-axis direction. In other words, the optical axis M of the first optical system 31 is perpendicular to the screen S. The second optical system 32 is a refracting optical system. An optical axis N of the second optical system 32 extends along the Y-axis direction. The screen S is located at the Z1 direction side of the optical axis N.

As shown in FIG. 3 and FIG. 4, the first optical system 31 is provided with a first optical element 33 and a second optical element 34. The first optical element 33 and the second optical element 34 are arranged in this order from the enlargement side toward the reduction side. An optical axis of the first optical element 33 and an optical axis of a third transmission surface 51 of the second optical element 34 are substantially parallel to each other, and extend along the Z-axis direction. In the present example, the optical axis of the first optical element 33 and the optical axis of the third transmission surface 51 of the second optical element 34 coincide with each other. In other words, the optical axis M of the first optical system 31 is the optical axis of the first optical element 33, and is the optical axis of the third transmission surface 51 of the second optical element 34.

The first optical element 33 is formed of a single optical element. The first optical element 33 is located at the Z2 direction side of the second optical element 34. The first optical element 33 has a first transmission surface 41, a first reflecting surface 42 located at a reduction side of the first transmission surface 41, and a second transmission surface 43 located at a reduction side of the first reflecting surface 42.

The first transmission surface 41 is provided with a convex shape facing to the Y1 direction. A first optical axis of the first transmission surface 41 coincides with the optical axis M of the first optical system 31. The first transmission surface 41 is provided with a rotationally symmetric shape centering on the first optical axis of the first transmission surface 41. The first transmission surface 41 has positive power. The first reflecting surface 42 is located at the Y2 direction side of the first transmission surface 41. The first reflecting surface 42 is provided with a concave shape concaved toward the Z2 direction. A second optical axis of the first reflecting surface 42 coincides with the optical axis M of the first optical system 31. The first reflecting surface 42 is provided with a rotationally symmetric shape centering on the second optical axis of the first reflecting surface 42. The first reflecting surface 42 has negative power. The first reflecting surface 42 is formed by disposing a reflective coating layer on the outer side surface at the Z2 direction side of the first optical element 33. A third optical axis of the second transmission surface 43 coincides with the optical axis M of the first optical system 31. The second transmission surface 43 is provided with a rotationally symmetric shape centering on the third optical axis of the second transmission surface 43. The second transmission surface 43 has negative power. The first reflecting surface 42 and the second transmission surface 43 are each provided with an aspherical shape.

The second optical element 34 is formed of a single optical element. The second optical element 34 is provided with the third transmission surface 51, a second reflecting surface 52 located at a reduction side of the third transmission surface 51, and a fourth transmission surface 53 located at a reduction side of the second reflecting surface 52. The third transmission surface 51 is opposed in the Z-axis direction to the second transmission surface 43. The third transmission surface 51 is provided with a convex shape facing to the Z2 direction. An optical axis of the third transmission surface 51 coincides with the optical axis M of the first optical system 31. The third transmission surface 51 is provided with a rotationally symmetric shape centering on the optical axis of the third transmission surface 51. The third transmission surface 51 has negative power. The second reflecting surface 52 is a plane mirror with no power. The second reflecting surface 52 is tilted 45° with respect to the Y axis and the Z axis. The second reflecting surface 52 folds the light path as much as 90° between the third transmission surface 51 and the fourth transmission surface 53. The second reflecting surface 52 is formed by disposing a reflective coating layer on the outer side surface at the Z1 direction side of the second optical element 34. The fourth transmission surface 53 faces to the Y2 direction, and is opposed to a lens L12. An angle formed between the optical axis of the fourth transmission surface 53 and the optical axis of the third transmission surface 51 is 90°. In other words, an angle formed between the optical axis of the fourth transmission surface 53 and the optical axis M of the first optical element 33 is 90°. Further, the optical axis of the fourth transmission surface 53 coincides with the optical axis N of the second optical system 32. The fourth transmission surface 53 is provided with a rotationally symmetric shape centering on the optical axis of the fourth transmission surface 53. The fourth transmission surface 53 has positive power. The third transmission surface 51 and the fourth transmission surface 53 are each provided with an aspherical shape.

As show in FIG. 3, the second optical system 32 is provided with 12 lenses L1 through L12. The lens L1 through the lens L12 are arranged in this order from the reduction side toward the enlargement side. The lens L2, the lens L7, and the lens L12 are each an aspherical lens provided with aspherical shapes on the both surfaces. Each of the lenses in the first optical system 31 is provided with a rotationally symmetric surface centering on the optical axis N.

Here, as shown in FIG. 3, the liquid crystal panel 18 arranged on the reduction-side conjugated plane of the optical system 3A forms the projection image at the Z2 direction side of the optical axis N. Further, an angle θ1 formed between the optical axis M of the first optical element 33 and the optical axis N of the second optical system 32 is no larger than 90°. In the present example, the angle θ1 formed therebetween is 90°. Therefore, the light from the liquid crystal panel 18 side passes through the second optical system 32, and is then folded as much as 90° by the second reflecting surface 52 of the second optical element 34, and then proceeds toward the Z2 direction. The light proceeding toward the Z2 direction is folded by the first reflecting surface 42 of the first optical element 33 toward the Z1 direction and the Y1 direction, and then reaches the screen S.

Further, as shown in FIG. 3, the optical system 3A forms an intermediate image 30 conjugated with the reduction-side conjugated plane and the enlargement-side conjugated plane between the reduction-side conjugated plane and the enlargement-side conjugated plane. In the present example, the intermediate image 30 is formed between the first reflecting surface 42 of the first optical element 33 and the second reflecting surface 52 of the second optical element 34.

Here, as shown in FIG. 4, the light proceeding between the first transmission surface 41 and the first reflecting surface 42 is provided with peripheral light L tilted in a direction of getting away from the screen S as the enlargement-side conjugated plane as coming closer to the first transmission surface 41. The peripheral light L is tilted in a direction of coming closer to the screen S as getting away from the first transmission surface 41 between the first transmission surface 41 and the screen S. Further, an imaginary line Q connecting a maximal effective point P of the peripheral light L on the first transmission surface 41 and the center of curvature of the first transmission surface 41 crosses the first optical axis at an angle θ2 no smaller than 90°.

Lens data of the optical system 3A are as follows. Surface numbers are attached in sequence from the enlargement side toward the reduction side. Reference symbols are reference symbols of the liquid crystal panels, the dichroic prisms, the lenses, and the screen. Data of the surface numbers which do not correspond to the liquid crystal panels, the dichroic prisms, the lenses, or the screen are dummy data. The surfaces having the surface numbers attached with "*" are aspherical surfaces. The reference symbol R represents a curvature radius. The reference symbol D represents an axial surface distance. The reference symbol nd represents a refractive index. The reference symbol vd represents an Abbe number. The reference symbol Y represents an aperture radius. The units of R, D, and Y are millimeters. It should be noted that the lens data in the present example are designed using CODE V produced by Synopsys, INC.

| REFER-ENCE SYMBOL | SURFACE NUMBER | R | D | nd | vd | MODE | Y |
|---|---|---|---|---|---|---|---|
| 18 | 0 | 0.00000 | 22.000000 | | | REFRACTION | |
| 19 | 1 | 0.00000 | 37.300000 | 1.516800 | 64.17 | REFRACTION | 18.4130 |
| | 2 | 0.00000 | 0.409841 | | | REFRACTION | 22.0000 |
| L1 | 3 | −590.67796 | 10.000000 | 1.601496 | 58.49 | REFRACTION | 22.0000 |
| | 4 | −42.72242 | 3.000000 | | | REFRACTION | 22.4270 |
| L2 | *5 | −31.66863 | 2.000000 | 2.001100 | 28.26 | REFRACTION | 21.9910 |
| | *6 | −61.15100 | 0.500000 | | | REFRACTION | 23.5070 |
| L3 | 7 | 144.21520 | 2.000000 | 2.001000 | 29.13 | REFRACTION | 25.6220 |
| | 8 | 122.54476 | 0.500000 | | | REFRACTION | 25.8240 |
| L4 | 9 | 90.65158 | 7.654132 | 1.505040 | 72.69 | REFRACTION | 26.5750 |
| | 10 | 654.66116 | 0.500000 | | | REFRACTION | 27.2070 |
| L5 | 11 | 112.22630 | 2.000000 | 1.879323 | 36.94 | REFRACTION | 28.0900 |
| | 12 | 76.00335 | 1.535871 | | | REFRACTION | 28.1060 |
| L6 | 13 | 92.61405 | 20.000000 | 1.480772 | 78.39 | REFRACTION | 28.3600 |
| | 14 | −46.55932 | 80.000000 | | | REFRACTION | 29.1400 |
| 0 | 15 | 0.00000 | 78.806011 | | | REFRACTION | 17.0000 |
| L7 | *16 | 68.28008 | 7.570544 | 1.509398 | 56.47 | REFRACTION | 40.0000 |
| | *17 | 94.93422 | 71.132325 | | | REFRACTION | 34.5630 |
| L8 | 18 | −1518.99365 | 19.999983 | 2.002500 | 19.32 | REFRACTION | 43.9240 |
| | 19 | −155.81886 | 17.456943 | | | REFRACTION | 45.2540 |
| L9 | 20 | 71.47955 | 30.000000 | 1.529865 | 45.90 | REFRACTION | 40.9460 |
| | 21 | −121.50056 | 1.883188 | | | REFRACTION | 37.5510 |
| L10 | 22 | −101.70642 | 2.000000 | 2.002700 | 19.32 | REFRACTION | 36.5880 |
| | 23 | 82.52373 | 31.678777 | | | REFRACTION | 34.9860 |
| L11 | 24 | −105.69324 | 4.989296 | 1.437001 | 95.10 | REFRACTION | 39.9880 |
| | 25 | −89.28078 | 17.118289 | | | REFRACTION | 40.9730 |
| L12 | *26 | −23.55002 | 8.000000 | 1.509398 | 56.47 | REFRACTION | 48.0000 |
| | *27 | −165.75191 | 43.658778 | | | REFRACTION | 47.5050 |
| 34 | *28 | −100.00000 | 72.000000 | 1.509398 | 56.47 | REFRACTION | 57.2550 |
| | 29 | 0.00000 | −15.000000 | 1.509398 | 56.47 | REFLECTION | 81.6940 |
| | *30 | 2014.46301 | −3.472339 | | | REFRACTION | 63.3480 |
| 33 | *31 | −138.80012 | −64.000000 | 1.509398 | 56.47 | REFRACTION | 62.0000 |
| | *32 | 33.36242 | 0.000000 | 1.509398 | 56.47 | REFLECTION | 69.4220 |
| | 33 | −80.00000 | 0.000000 | | | REFRACTION | 41.5690 |
| | 34 | 0.00000 | 0.000000 | | | REFRACTION | 1773.6130 |
| S | 35 | 0.00000 | 0.000000 | | | REFRACTION | 1773.6130 |

Aspheric coefficients are as follows.

| SURFACE NUMBER | 5 | 6 | 16 | 17 | 26 |
|---|---|---|---|---|---|
| CONIC CONSTANT | −1E+00 | −1E+00 | −1E+00 | −1E+00 | −1.133807E+00 |
| 4-TH-ORDER COEFFICIENT | 3.694405E−06 | 7.654845E−06 | 2.143317E−06 | 2.748365E−06 | −4.559836E−06 |
| 6-TH-ORDER COEFFICIENT | −8.028217E−09 | −6.949011E−09 | 1.366512E−09 | 1.549676E−09 | −3.539447E−09 |
| 8-TH-ORDER COEFFICIENT | 6.506012E−12 | 8.18826E−12 | −1.450751E−13 | 1.723083E−13 | 1.671317E−12 |

-continued

| 10-TH-ORDER COEFFICIENT | −1.527956E−15 | −2.860017E−15 | 1.382604E−16 | 1.058483E−16 | −2.300276E−16 |
|---|---|---|---|---|---|

| SURFACE NUMBER | 27 | 28 | 30 | 31 | 32 |
|---|---|---|---|---|---|
| CONIC CONSTANT | −5.958633E+01 | −1.074643E+01 | −1.115037E+43 | −4.86632E+01 | −1.098222E+00 |
| 4-TH-ORDER COEFFICIENT | −4.700304E−06 | 2.368596E−06 | −2.160545E−06 | −2.274983E−06 | −1.57618E−06 |
| 6-TH-ORDER COEFFICIENT | 1.031617E−09 | −7.978636E−10 | 1.808458E−09 | 7.397958E−10 | 1.305372E−10 |
| 8-TH-ORDER COEFFICIENT | −2.69451E−13 | 1.397035E−13 | −3.726332E−13 | 8.793392E−15 | 2.869818E−14 |
| 10-TH-ORDER COEFFICIENT | 5.580673E−17 | −9.252121E−18 | 2.502569E−17 | −1.5262728E−18 | −3.836358E−18 |

Ray coordinates on an object surface are as follows.

| RAY NUMBER | X COORDINATE | Y COORDINATE |
|---|---|---|
| 1 | 0 | −1.38 |
| 2 | 0 | −4.83 |
| 3 | 0 | −8.28 |
| 4 | 0 | −11.73 |
| 5 | 0 | −15.18 |

Further, in the present example, the surface numbers 29, 33, and 34 are each an eccentric surface. Parameters of the eccentric surfaces are as follows.

| SURFACE NUMBER | 29 |
|---|---|
| TYPE OF ECCENTRICITY | DECENTERED AND BENT |
| PARAMETER X | 0.0000 |
| PARAMETER Y | 0.0000 |
| PARAMETER Z | 0.0000 |
| PARAMETER α | 45.0000 |
| SURFACE NUMBER | 33 |
| TYPE OF ECCENTRICITY | GLOBAL COORDINATE |
| GLOBAL REFERENCE SURFACE | 32 |
| PARAMETER X | 0.0000 |
| PARAMETER Y | −80.0000 |
| PARAMETER Z | 44.6790 |
| PARAMETER α | −90.0000 |
| SURFACE NUMBER | 34 |
| TYPE OF ECCENTRICITY | GLOBAL COORDINATE |
| GLOBAL REFERENCE SURFACE | 32 |
| PARAMETER X | 0.0000 |
| PARAMETER Y | 0.0000 |
| PARAMETER Z | 201.0000 |
| PARAMETER α | 0.0000 |

Functions and Advantages

In the optical system 3A according to the present example, the first optical element 33 located at an enlargement extreme side has the first transmission surface 41, the first reflecting surface 42 located at the reduction side of the first transmission surface 41, and the second transmission surface 43 located at the reduction side of the first reflecting surface 42. The first transmission surface 41 has power. Further, in the optical system 3A according to the present example, the light passing between the first transmission surface 41 and the first reflecting surface 42 is provided with the peripheral light L tilted in the direction of getting away from the screen S as the enlargement-side conjugated plane as coming closer to the first transmission surface 41. The peripheral light L is tilted in the direction of coming closer to the screen S as getting away from the first transmission surface 41 between the first transmission surface 41 and the screen S.

According to the present example, inside the first optical element 33, the light proceeding from the first reflecting surface 42 toward the first transmission surface 41 is provided with the peripheral light L tilted in the direction of getting away from the screen S as coming closer to the first transmission surface 41. Therefore, when the light having entered the first optical element 33 from the second transmission surface 43 at the reduction side is folded by the first reflecting surface 42 and then proceeds toward the first transmission surface 41, the peripheral light L of that light proceeds toward the direction of getting away from the screen S. Here, when that peripheral light L fails to reach the screen S, there occurs a problem that the periphery of an enlarged image projected on the screen S becomes dark. In contrast, in the present example, the first transmission surface 41 has power. Thus, the peripheral light L is tilted in a direction of coming closer to the screen S as getting away from the first transmission surface 41 between the first transmission surface 41 and the screen S. In other words, the peripheral light L which is folded by the first reflecting surface 42, and then proceeds toward the direction of getting away from the screen S in the first optical element 33 proceeds toward the screen S via the first transmission surface 41. Therefore, it is possible to ensure an amount of light on the periphery of the enlarged image to be projected on the screen S.

Here, in the present example, the first transmission surface 41 is provided with a convex shape rotationally symmetric centering on the first optical axis thereof. Further, when defining the imaginary line Q connecting the maximal effective point P of the peripheral light L on the first transmission surface 41 and the center of curvature of the first transmission surface 41, the imaginary line Q crosses the first optical axis at an angle θ no smaller than 90°. Therefore, in the optical system 3A according to the present example, even when the peripheral light L of the light folded by the first reflecting surface 42 has reached the area which fails to be directly opposed to the screen S on the first transmission surface 41, it is possible to make that peripheral light L reach the screen. Therefore, it is easy to ensure an amount of light on the periphery of the enlarged image to be projected on the screen S.

In the present example, the second optical axis of the first reflecting surface 42 and the third optical axis of the second transmission surface 43 coincide with the first optical axis.

By adopting such a configuration, it becomes easy to manu-facture the first optical element 33.

In the present example, the first reflecting surface 42 and the second transmission surface 43 are each provided with an aspherical shape. Therefore, it is easier to correct a variety of aberrations.

Then, the optical system 3A according to the present example is provided with the second optical element 34 arranged at the reduction side of the first optical element 33, and the second optical system 32 (the refracting optical system) arranged at the reduction side of the second optical element 34. The second optical element 34 has the third transmission surface 51, the second reflecting surface 52 located at the reduction side of the third transmission surface 51, and the fourth transmission surface 53 located at the reduction side of the second reflecting surface 52. Further, the second transmission surface 43 of the first optical element 33 and the third transmission surface 51 of the second optical element 34 are opposed to each other, and the light from the reduction-side conjugated plane enters the second transmission surface via the second optical system 32 and the second optical element 34.

Further, in the present example, the angle θ1 formed between the optical axis M of the first optical element 33 and the optical axis N of the second optical system 32 is no larger than 90°. Thus, the optical elements to be arranged at the reduction side of the second optical element 34 can be arranged in a direction parallel to the enlargement-side imaging plane, or a direction of getting away from the enlargement-side imaging plane. Therefore, it is possible to prevent the optical elements to be arranged at the enlarge-ment side of the second optical element 34 from interfering with the enlargement-side imaging plane. Therefore, it is possible to arrange the optical system at a position close to the screen S.

Figure 5:
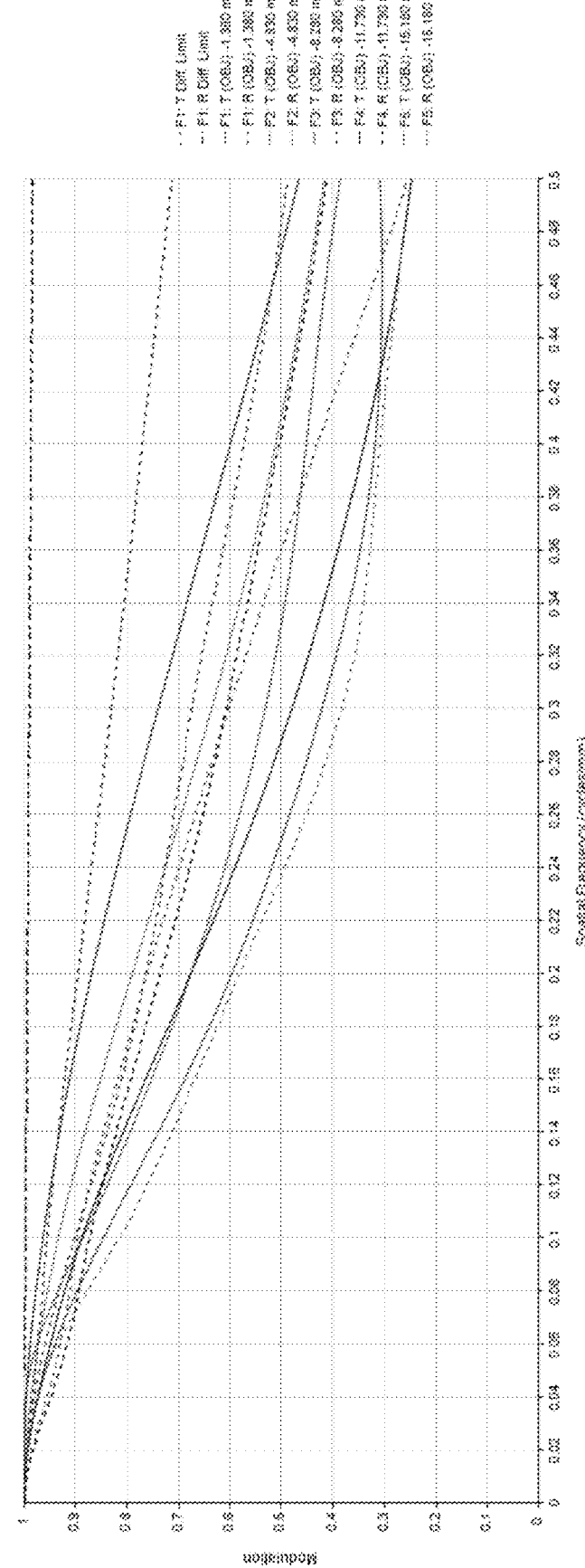
FIG. 5 is a diagram showing an MTF at an enlargement side of the optical system according to Practical Example 1.

FIG. 5 is a diagram showing an MTF at the enlargement side of the optical system 3A. In FIG. 5, the horizontal axis represents a spatial frequency, and the vertical axis repre-sents a contrast reproduction rate. As shown in FIG. 5, the optical system 3A according to the present example is high in resolution.

Figure 6:
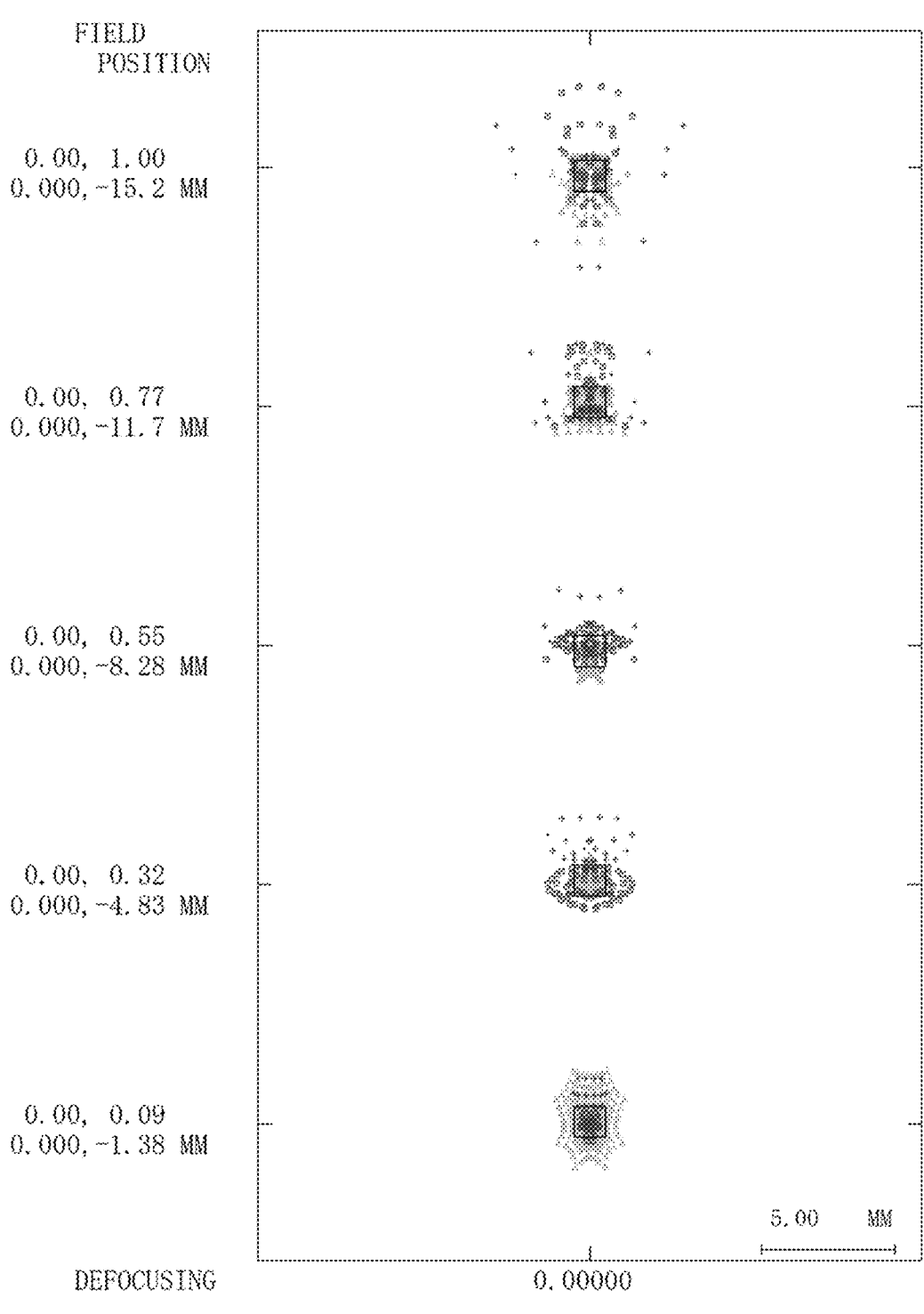
FIG. 6 is a spot diagram of the optical system according to Practical Example 1.

FIG. 6 is a spot diagram of the optical system 3A. As shown in FIG. 6, in the present example, a variation in spot is suppressed.

Practical Example 2

Figure 7:
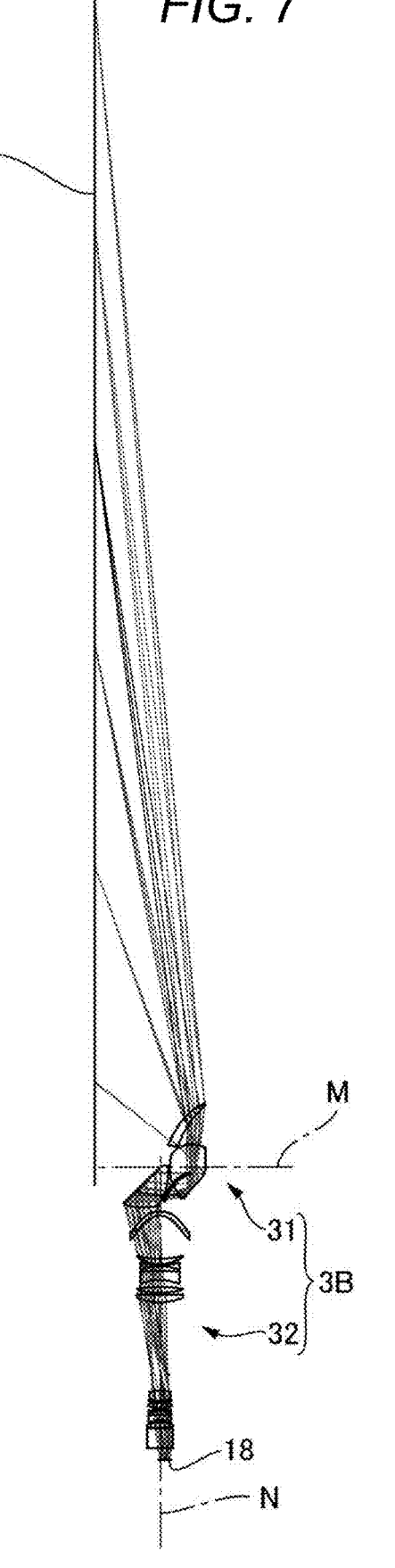
FIG. 7 is a ray chart schematically showing a whole of an optical system according to Practical Example 2.
Figure 8:
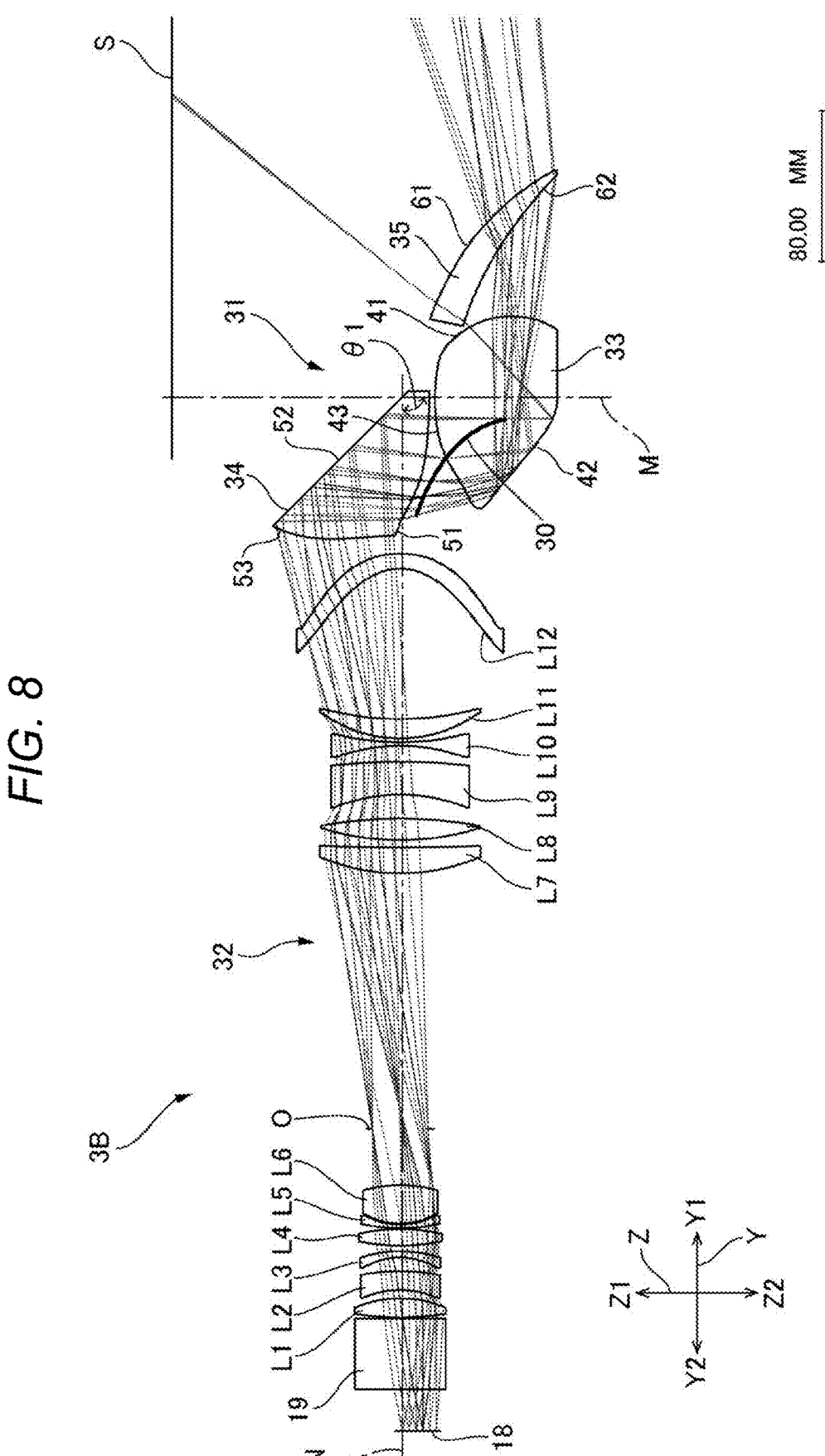
FIG. 8 is a ray chart of the optical system according to Practical Example 2.
Figure 9:
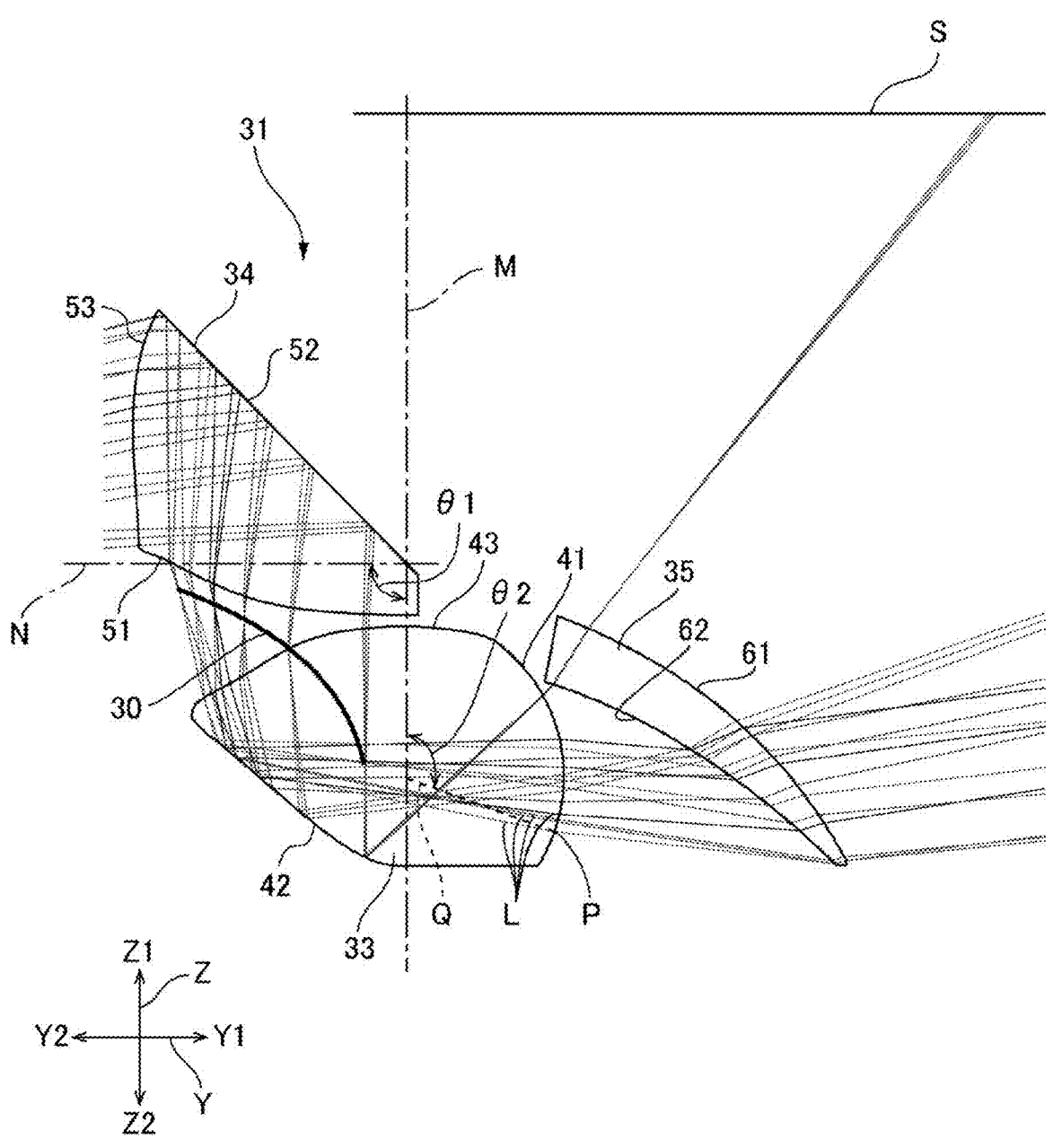
FIG. 9 is a ray chart of a first optical system in Practical Example 2.

FIG. 7 is a ray chart schematically showing a whole of an optical system according to Practical Example 2. FIG. 8 is a ray chart of the optical system 3B according to Practical Example 2. FIG. 9 is a ray chart of a first optical system in Practical Example 2. As shown in FIG. 7 and FIG. 8, on a reduction-side conjugated plane of the optical system 3B, there is disposed the liquid crystal panel 18.

As shown in FIG. 6, the optical system 3B according to the present example has a first optical system 31 and a second optical system 32 disposed in sequence from an enlargement side toward a reduction side. The first optical system 31 is a reflective optical system. An optical axis M of the first optical system 31 extends along the Z-axis direction. In other words, the optical axis M of the first optical system 31 is perpendicular to the screen S. The second optical system 32 is a refracting optical system. An optical axis N of the second optical system 32 extends along the Y-axis direction. The screen S is located at the Z1 direction side of the optical axis N.

As shown in FIG. 7 and FIG. 8, the first optical system 31 is provided with a lens 35, a first optical element 33, and a second optical element 34. The lens 35, the first optical element 33, and the second optical element 34 are arranged in this order from the enlargement side toward the reduction side. An optical axis of the first optical element 33 and an optical axis of a third transmission surface 51 of the second optical element 34 are substantially parallel to each other, and extend along the Z-axis direction. In the present example, the optical axis of the first optical element 33 and the optical axis of the third transmission surface 51 of the second optical element 34 coincide with each other. Further, the optical axis of the first optical element 33 and a fourth optical axis of the lens 35 coincide with each other. In other words, the optical axis M of the first optical system 31 is the optical axis of the first optical element 33, and is the optical axis of the third transmission surface 51 of the second optical element 34, and is a fourth optical axis of the lens 35.

The lens 35 is located at the Y1 direction side of the first optical element 33. The lens 35 has positive power. The lens 35 is provided with a first lens surface 61 facing to the enlargement side, and a second lens surface 62 facing to the reduction side. The first lens surface 61 is provided with a convex shape. The first lens surface 61 is provided with an aspherical shape. The second lens surface 62 is provided with a concave shape. The second lens surface 62 is pro-vided with an aspherical shape. The first lens surface 61 and the second lens surface 62 are each provided with a rota-tionally symmetric shape centering on the fourth optical axis of the lens 35.

The first optical element 33 is formed of a single optical element. The first optical element 33 is located at the Z2 direction side of the second optical element 34. The first optical element 33 has a first transmission surface 41, a first reflecting surface 42 located at a reduction side of the first transmission surface 41, and a second transmission surface 43 located at a reduction side of the first reflecting surface 42.

The first transmission surface 41 is provided with a convex shape facing to the Y1 direction. A first optical axis of the first transmission surface 41 coincides with the optical axis M of the first optical system 31. The first transmission surface 41 is provided with a rotationally symmetric shape centering on the first optical axis of the first transmission surface 41. The first transmission surface 41 has positive power. The first reflecting surface 42 is located at the Y2 direction side of the first transmission surface 41. The first reflecting surface 42 is provided with a concave shape concaved toward the Z2 direction. A second optical axis of the first reflecting surface 42 coincides with the optical axis M of the first optical system 31. The first reflecting surface 42 is provided with a rotationally symmetric shape centering on the second optical axis of the first reflecting surface 42. The first reflecting surface 42 has negative power. The first reflecting surface 42 is formed by disposing a reflective coating layer on the outer side surface at the Z2 direction side of the first optical element 33. A third optical axis of the second transmission surface 43 coincides with the optical axis M of the first optical system 31. The second transmis-sion surface 43 is provided with a rotationally symmetric shape centering on the third optical axis of the second transmission surface 43. The second transmission surface 43 has negative power. The first reflecting surface 42 and the second transmission surface 43 are each provided with an aspherical shape.

The second optical element 34 is formed of a single optical element. The second optical element 34 is provided with the third transmission surface 51, a second reflecting surface 52 located at a reduction side of the third transmission surface 51, and a fourth transmission surface 53 located at a reduction side of the second reflecting surface 52. The third transmission surface 51 is opposed in the Z-axis direction to the second transmission surface 43. The third transmission surface 51 is provided with a convex shape facing to the Z2 direction. The optical axis of the third transmission surface 51 coincides with the optical axis M of the first optical system 31. The third transmission surface 51 is provided with a rotationally symmetric shape centering on the optical axis of the third transmission surface 51. The third transmission surface 51 has negative power. The second reflecting surface 52 is a plane mirror with no power. The second reflecting surface 52 is tilted 45° with respect to the Y axis and the Z axis. The second reflecting surface 52 folds the light path as much as 90° between the third transmission surface 51 and the fourth transmission surface 53. The second reflecting surface 52 is formed by disposing a reflective coating layer on the outer side surface at the Z1 direction side of the second optical element 34. The fourth transmission surface 53 faces to the Y2 direction, and is opposed to a lens L12. An angle formed between the optical axis of the fourth transmission surface 53 and the optical axis of the third transmission surface 51 is 90°. In other words, an angle formed between the optical axis of the fourth transmission surface 53 and the optical axis M of the first optical element 33 is 90°. Further, the optical axis of the fourth transmission surface 53 coincides with the optical axis N of the second optical system 32. The fourth transmission surface 53 is provided with a rotationally symmetric shape centering on the optical axis of the fourth transmission surface 53. The fourth transmission surface 53 has positive power. The third transmission surface 51 and the fourth transmission surface 53 are each provided with an aspherical shape.

As show in FIG. 8, the second optical system 32 is provided with 12 lenses L1 through L12. The lens L1 through the lens L12 are arranged in this order from the reduction side toward the enlargement side. The lens L2, the lens L7, and the lens L12 are each an aspherical lens provided with aspherical shapes on the both surfaces. Each of the lenses in the first optical system 31 is provided with a rotationally symmetric surface centering on the optical axis N.

Here, as shown in FIG. 8, the liquid crystal panel 18 arranged on the reduction-side conjugated plane of the optical system 3A forms the projection image at the Z2 direction side of the optical axis N. Further, an angle θ1 formed between the optical axis M of the first optical element 33 and the optical axis N of the second optical system 32 is no larger than 90°. In the present example, the angle θ1 formed therebetween is 90°. Therefore, the light from the liquid crystal panel 18 side passes through the second optical system 32, and is then folded as much as 90° by the second reflecting surface 52 of the second optical element 34, and then proceeds toward the Z2 direction. The light proceeding toward the Z2 direction is folded by the first reflecting surface 42 of the first optical element 33 toward the Z1 direction and the Y1 direction, and then reaches the screen S.

Further, as shown in FIG. 8, the optical system 3A forms an intermediate image 30 conjugated with the reduction-side conjugated plane and the enlargement-side conjugated plane between the reduction-side conjugated plane and the enlargement-side conjugated plane. In the present example, the intermediate image 30 is formed between the first reflecting surface 42 of the first optical element 33 and the second reflecting surface 52 of the second optical element 34.

Here, as shown in FIG. 9, the light proceeding between the first transmission surface 41 and the first reflecting surface 42 is provided with peripheral light L tilted in a direction of getting away from the screen S as the enlargement-side conjugated plane as coming closer to the first transmission surface 41. The peripheral light L is tilted in a direction of getting away from the screen S as getting away from the first transmission surface 41 between the first transmission surface 41 and the lens 35. Further, the peripheral light L is tilted in a direction of coming closer to the screen S as getting away from the lens 35 between the lens 35 and the screen S. Further, an imaginary line Q connecting a maximal effective point P of the peripheral light L on the first transmission surface 41 and the center of curvature of the first transmission surface 41 crosses the first optical axis at an angle θ2 no smaller than 90°.

Lens data of the optical system 3B are as follows. Surface numbers are attached in sequence from the enlargement side toward the reduction side. Reference symbols are reference symbols of the liquid crystal panels, the dichroic prisms, the lenses, and the screen. Data of the surface numbers which do not correspond to the liquid crystal panels, the dichroic prisms, the lenses, or the screen are dummy data. The surfaces having the surface numbers attached with "*" are aspherical surfaces. The reference symbol R represents a curvature radius. The reference symbol D represents an axial surface distance. The reference symbol nd represents a refractive index. The reference symbol vd represents an Abbe number. The reference symbol Y represents an aperture radius. The units of R, D, and Y are millimeters. It should be noted that the lens data in the present example are designed using CODE V produced by Synopsys, INC.

| REFER-ENCE SYMBOL | SURFACE NUMBER | R | D | nd | vd | MODE | Y |
|---|---|---|---|---|---|---|---|
| 18 | 0 | 0.00000 | 22.000000 | | | REFRACTION | |
| 19 | 1 | 0.00000 | 37.300000 | 1.516800 | 64.17 | REFRACTION | 20.3480 |
| | 2 | 0.00000 | 0.762700 | | | REFRACTION | 22.1060 |
| L1 | 3 | 157.73710 | 10.000000 | 1.994904 | 27.96 | REFRACTION | 22.2740 |
| | 4 | −59.76320 | 4.440906 | | | REFRACTION | 22.1250 |
| L2 | 5 | −47.37529 | 10.000000 | 2.050800 | 26.94 | REFRACTION | 19.2330 |
| | 6 | −103.89113 | 7.276867 | | | REFRACTION | 19.2740 |
| L3 | 7 | −35.49424 | 3.259752 | 1.937229 | 32.32 | REFRACTION | 18.4950 |
| | 8 | −63.50302 | 3.002572 | | | REFRACTION | 19.5370 |
| L4 | 9 | 103.13388 | 8.732663 | 1.658725 | 41.40 | REFRACTION | 20.1430 |
| | 10 | −94.40586 | 0.500000 | | | REFRACTION | 19.9850 |

-continued

| REFER- ENCE SYMBOL | SURFACE NUMBER | R | D | nd | vd | MODE | Y |
|---|---|---|---|---|---|---|---|
| L5 | 11 | 89.94729 | 2.000000 | 2.050800 | 26.94 | REFRACTION | 19.0060 |
| | 12 | 37.49030 | 0.500000 | | | REFRACTION | 18.0290 |
| L6 | 13 | 36.86363 | 20.000000 | 1.446156 | 80.88 | REFRACTION | 18.1140 |
| | 14 | −69.65825 | 30.000000 | | | REFRACTION | 17.0000 |
| 0 | 15 | 0.00000 | 134-97204 | | | REFRACTION | 14.400 |
| L7 | 16 | 105.41092 | 13.783413 | 1.469124 | 82.22 | REFRACTION | 40.0000 |
| | 17 | 1094.72746 | 3.834971 | | | REFRACTION | 39.0280 |
| L8 | 18 | 137.23940 | 11.351333 | 1.986125 | 16.48 | REFRACTION | 39.2540 |
| | 19 | −228.96975 | 12.674715 | | | REFRACTION | 38.9460 |
| L9 | 20 | −90.50307 | 17.528035 | 1.869148 | 18.09 | REFRACTION | 34.1820 |
| | 21 | −301.24837 | 8.314561 | | | REFRACTION | 33.5580 |
| L10 | 22 | −97.26184 | 2.000000 | 1.986125 | 16.48 | REFRACTION | 32.8700 |
| | 23 | 137.98515 | 2.000000 | | | REFRACTION | 34.1190 |
| L11 | 24 | 70.50560 | 10.000000 | 1.455365 | 87.06 | REFRACTION | 39.7670 |
| | 25 | 157.41492 | 79.583464 | | | REFRACTION | 39.9520 |
| L12 | *26 | −27.57550 | 8.000000 | 1.509186 | 56.32 | REFRACTION | 48.0000 |
| | *27 | −47.11522 | 9.521845 | | | REFRACTION | 51.6580 |
| 34 | *28 | −140.46983 | 72.000000 | 1.509186 | 56.32 | REFRACTION | 64.8350 |
| | 29 | 0.00000 | −15.000000 | 1.509186 | 56.32 | REFLECTION | 91.6220 |
| | *30 | 230.59254 | −3.000000 | | | REFRACTION | 63.7000 |
| 33 | *31 | −54.82491 | −64.000000 | 1.509186 | 56.32 | REFRACTION | 54.3140 |
| | *32 | 20.67261 | 0.000000 | 1.509186 | 56.32 | REFLECTION | 51.1060 |
| | 33 | −44.00000 | 0.000000 | | | REFRACTION | 21.6820 |
| 35 | *34 | −131.10106 | 20.000000 | 1.509186 | 56.32 | REFRACTION | 117.8940 |
| | *35 | −100.00000 | 0.000000 | | | REFRACTION | 120.9940 |
| | 36 | 0.00000 | 0.000000 | | | REFRACTION | 2186.7700 |
| S | 37 | 0.00000 | 0.000000 | | | REFRACTION | 2186.7700 |

Aspheric coefficients are as follows.

| SURFACE NUMBER | 26 | 27 | 28 | 30 |
|---|---|---|---|---|
| CONIC CONSTANT | −7.983351E−01 | −7.935454E−01 | −5.694192E+01 | 7.416526E−01 |
| 4-TH-ORDER COEFFICIENT | 1.571127E−06 | −2.932391E−06 | 8.694656E−07 | −5.656628E−07 |
| 6-TH-ORDER COEFFICIENT | −5.227067E−10 | 7.948796E−10 | −1.45704E−10 | 7.550079E−10 |
| 8-TH-ORDER COEFFICIENT | 4.752561E−13 | −2.731021E−13 | 3.119986E−14 | −2.009279E−13 |
| 10-TH-ORDER COEFFICIENT | −3.805627E−17 | 7.607665E−17 | −2.61777E−18 | 1.677154E−17 |

| SURFACE NUMBER | 31 | 32 | 34 | 35 |
|---|---|---|---|---|
| CONIC CONSTANT | −1.386817E+02 | −1.637304E+00 | −4.949426E−01 | −4.448864E−01 |
| 4-TH-ORDER COEFFICIENT | −4.815839E−06 | −1.617638E−06 | 2.724492E−08 | 3.262084E−07 |
| 6-TH-ORDER COEFFICIENT | 5.544913E−10 | 2.867275E−10 | −1.631719E−12 | −2.720302E−11 |
| 8-TH-ORDER COEFFICIENT | 5.021641E−13 | 5.726965E−14 | 2.587226E−16 | 1.045415E−15 |
| 10-TH-ORDER COEFFICIENT | −1.123307E−16 | −2.044994E−17 | −9.382203E−21 | −5.756513E−21 |

Ray coordinates on an object surface are as follows.

| RAY NUMBER | X COORDINATE | Y COORDINATE |
|---|---|---|
| 1 | 0 | −1.38 |
| 2 | 0 | −4.86 |
| 3 | 0 | −8.34 |
| 4 | 0 | −11.81 |
| 5 | 0 | −15.29 |
| 6 | 0 | −18.77 |

Further, in the present example, the surface numbers 29, 33, 34, and 36 are each an eccentric surface. Parameters of the eccentric surfaces are as follows.

| SURFACE NUMBER | 29 |
|---|---|
| TYPE OF ECCENTRICITY | DECENTERED AND BENT |
| PARAMETER X | 0.0000 |
| PARAMETER Y | 0.0000 |
| PARAMETER Z | 0.0000 |
| PARAMETER α | 45.0000 |

-continued

| SURFACE NUMBER | 33 |
| --- | --- |
| TYPE OF ECCENTRICITY | GLOBAL COORDINATE |
| GLOBAL REFERENCE SURFACE | 32 |
| PARAMETER X | 0.0000 |
| PARAMETER Y | −44.0000 |
| PARAMETER Z | 24.0000 |
| PARAMETER α | −90.0000 |
| SURFACE NUMBER | 34 |
| TYPE OF ECCENTRICITY | GLOBAL COORDINATE |
| GLOBAL REFERENCE SURFACE | 32 |
| PARAMETER X | 0.0000 |
| PARAMETER Y | 0.0000 |
| PARAMETER Z | 55.0000 |
| PARAMETER α | 0.0000 |
| SURFACE NUMBER | 36 |
| TYPE OF ECCENTRICITY | GLOBAL COORDINATE |
| GLOBAL REFERENCE SURFACE | 32 |
| PARAMETER X | 0.0000 |
| PARAMETER Y | 0.0000 |
| PARAMETER Z | 201.0000 |
| PARAMETER α | 0.0000 |

Functions and Advantages

The optical system 3B is provided with the first optical element 33 and the lens 35 arranged at the enlargement side of the first optical element 33. The first optical element 33 has the first transmission surface 41, the first reflecting surface 42 located at the reduction side of the first transmission surface 41, and the second transmission surface 43 located at the reduction side of the first reflecting surface 42. The first transmission surface 41 has power. Further, in the optical system 3B according to the present example, the light passing between the first transmission surface 41 and the first reflecting surface 42 is provided with the peripheral light L tilted in the direction of getting away from the screen S as coming closer to the first transmission surface 41. The peripheral light L is tilted in the direction of getting away from the screen S as getting away from the first transmission surface 41 between the first transmission surface 41 and the lens 35. Further, the peripheral light L is tilted in the direction of coming closer to the screen S as getting away from the lens 35 between the lens 35 and the screen S.

According to the present example, inside the first optical element 33, the light proceeding from the first reflecting surface 42 toward the first transmission surface 41 is provided with the peripheral light L tilted in the direction of getting away from the screen S as coming closer to the first transmission surface 41. Further, the peripheral light L described above is tilted in the direction of getting away from the screen S as getting away from the first transmission surface 41 between the first transmission surface 41 and the lens 35. Therefore, when the light having entered the first optical element 33 from the second transmission surface 43 at the reduction side is folded by the first reflecting surface 42 and then proceeds toward the first transmission surface 41, the peripheral light L described above proceeds toward the direction of getting away from the screen S. Further, the peripheral light L also proceeds toward the direction of getting away from the screen S when proceeding toward the lens 35 from the first transmission surface 41. Here, when that peripheral light L fails to reach the screen S, there occurs the problem that the periphery of an enlarged image projected on the screen S becomes dark. In contrast, in the present example, the peripheral light L is tilted in the direction of coming closer to the screen S as getting away from the lens 35 between the lens 35 and the screen S. In other words, the peripheral light L which passes through the first optical element 33 and then proceeds toward the direction of getting away from the screen S proceeds toward the screen S via the lens 35. Therefore, it is possible to ensure an amount of light on the periphery of the enlarged image to be projected on the screen S.

Further, since the light to be projected is controlled by the lens 35 arranged at the enlargement side of the first optical element 33, it is possible to control the light to be projected at a position closer to the screen S compared to Practical Example 1. Thus, it is possible to improve the optical performance of the peripheral light L.

Here, in the present example, the first transmission surface 41 is provided with a convex shape rotationally symmetric centering on the first optical axis thereof. Further, when defining the imaginary line Q connecting the maximal effective point P of the peripheral light L on the first transmission surface 41 and the center of curvature of the first transmission surface 41, the imaginary line Q crosses the first optical axis at an angle θ no smaller than 90°. Therefore, in the optical system 3B according to the present example, even when the peripheral light L of the light folded by the first reflecting surface 42 has reached the area which fails to be directly opposed to the screen S on the first transmission surface 41, it is possible to make that peripheral light L reach the screen. Therefore, it is easy to ensure an amount of light on the periphery of the enlarged image to be projected on the screen S.

In the present example, the second optical axis of the first reflecting surface and the third optical axis of the second transmission surface coincide with the first optical axis. By adopting such a configuration, it becomes easy to manufacture the first optical element.

Further, in the present example, the fourth optical axis of the lens 35 coincides with the first optical axis. By adopting such a configuration, it is possible to accurately arrange the first optical element 33 and the lens 35 compared to when these optical axes do not coincide with each other.

In the present example, the lens 35 is provided with an aspheric shape. Therefore, it is easier to correct a variety of aberrations.

In the present example, the first reflecting surface 42 and the second transmission surface 43 are each provided with an aspherical shape. Therefore, it is easier to correct a variety of aberrations.

Then, the optical system 3B according to the present example is provided with the second optical element 34 arranged at the reduction side of the first optical element 33, and the second optical system 32 (the refracting optical system) arranged at the reduction side of the second optical element 34. The second optical element 34 has the third transmission surface 51, the second reflecting surface 52 located at the reduction side of the third transmission surface 51, and the fourth transmission surface 53 located at the reduction side of the second reflecting surface 52. Further, the second transmission surface 43 of the first optical element 33 and the third transmission surface 51 of the second optical element 34 are opposed to each other, and the light from the reduction-side conjugated plane enters the second transmission surface via the second optical system 32 and the second optical element 34.

Further, in the present example, the angle θ1 formed between the optical axis M of the first optical element 33 and the optical axis N of the second optical system 32 is no larger than 90°. Thus, the optical elements to be arranged at the reduction side of the second optical element 34 can be arranged in a direction parallel to the enlargement-side imaging plane, or a direction of getting away from the enlargement-side imaging plane. Therefore, it is possible to prevent the optical elements to be arranged at the enlargement side of the second optical element 34 from interfering with the enlargement-side imaging plane. Therefore, it is possible to arrange the optical system at a position close to the screen S.

Figure 10:
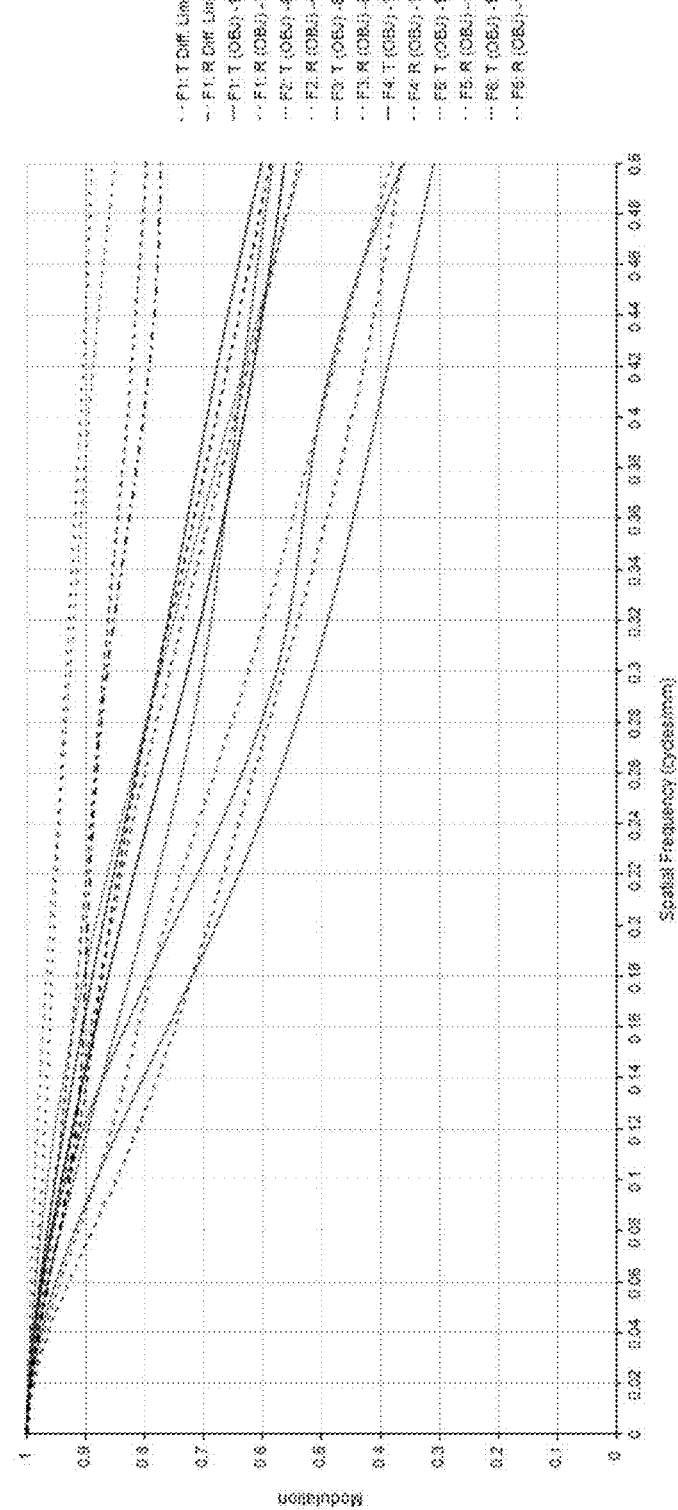
FIG. 10 is a diagram showing an MTF at an enlargement side of the optical system according to Practical Example 2.

FIG. 10 is a diagram showing an MTF at the enlargement side of the optical system 3B. In FIG. 10, the horizontal axis represents a spatial frequency, and the vertical axis represents a contrast reproduction rate. As shown in FIG. 10, the optical system 3B according to the present example is high in resolution.

Figure 11:
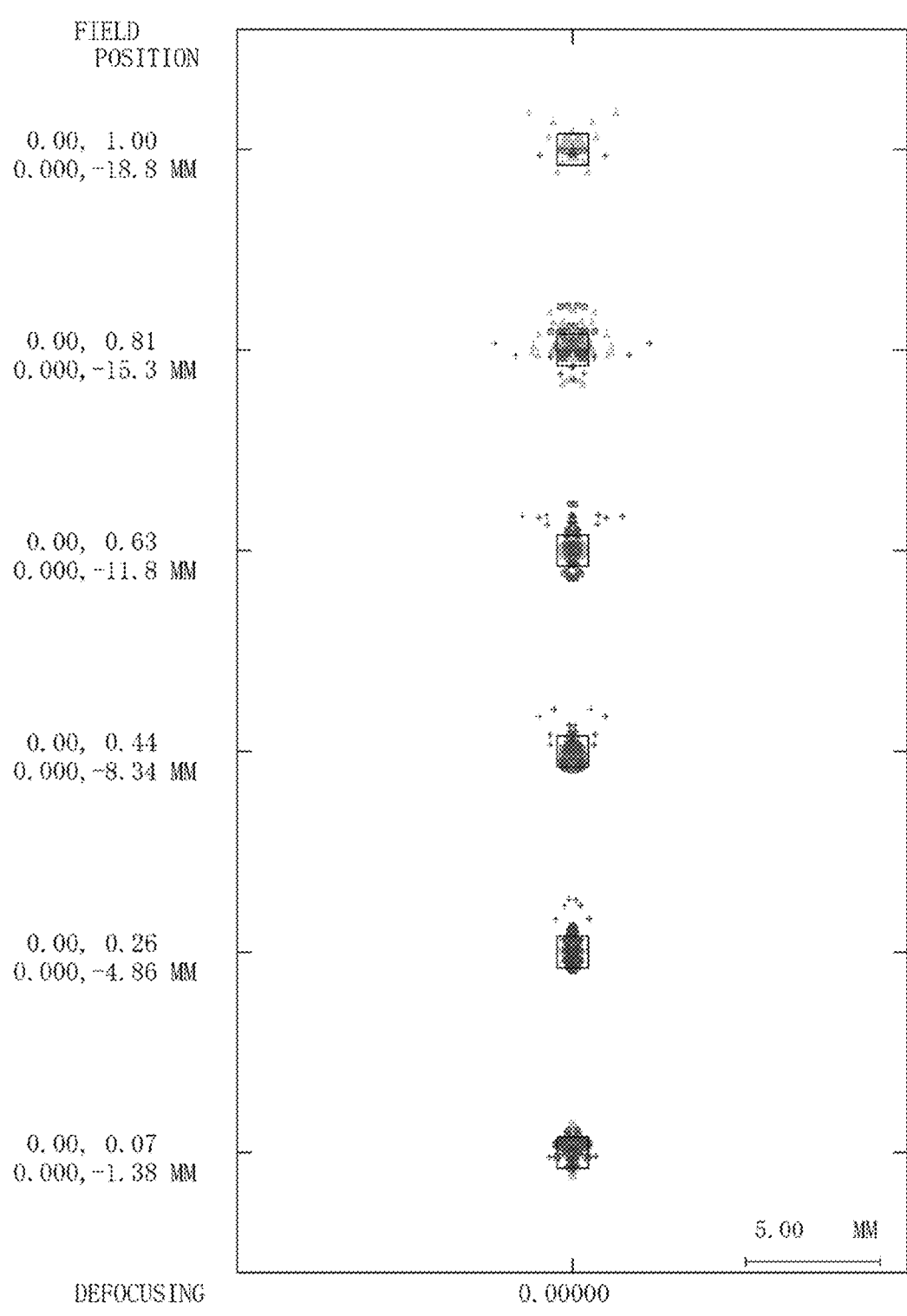
FIG. 11 is a spot diagram of the optical system according to Practical Example 2.

FIG. 11 is a spot diagram of the optical system 3B. As shown in FIG. 11, in the present example, a variation in spot is suppressed.

OTHER EMBODIMENTS

It should be noted that the optical system 3 in the present example can be used as an imaging lens. In this case, on the reduction-side conjugated plane of the optical system 3, there is arranged an imaging element.

What is claimed is:

1. An optical system comprising:

a first optical element, wherein the first optical element has a first transmission surface, a first reflecting surface arranged at a reduction side of the first transmission surface, and a second transmission surface arranged at the reduction side of the first reflecting surface, the first transmission surface has positive power, light passing between the first transmission surface and the first reflecting surface includes peripheral light tilted in a direction of getting away from an enlargement-side conjugated plane as coming closer to the first transmission surface, and the peripheral light is tilted in a direction of coming closer to the enlargement-side conjugated plane as getting away from the first transmission surface between the first transmission surface and the enlargement-side conjugated plane.

2. The optical system according to claim 1, wherein the first transmission surface has a rotationally symmetric convex shape centering on a first optical axis of the first transmission surface, and an imaginary line connecting a maximal effective point of the peripheral light on the first transmission surface and a curvature center of the first transmission surface intersects the first optical axis at an angle no smaller than 90°.

3. The optical system according to claim 2, wherein a second optical axis of the first reflecting surface and a third optical axis of the second transmission surface coincide with the first optical axis.

4. The optical system according to claim 3, wherein the first optical axis is perpendicular to the enlargement-side conjugated plane.

5. The optical system according to claim 1, further comprising:

a second optical element arranged at the reduction side of the first optical element; and a refracting optical system arranged at the reduction side of the second optical element, wherein the second optical element has a third transmission surface, a second reflecting surface arranged at the reduction side of the third transmission surface, and a fourth transmission surface arranged at the reduction side of the second reflecting surface, the second transmission surface and the third transmission surface are opposed to each other, and light emitted from a reduction-side conjugated plane enters the second transmission surface via the refracting optical system and the second optical element.

6. The optical system according to claim 5, wherein an angle formed between the first optical axis and an optical axis of the refracting optical system is no larger than 90°.

7. A projector comprising:

a light modulator arranged on a reduction-side conjugated plane and configured to modulate light emitted from a light source; and the optical system according to claim 1 configured to project the light modulated by the light modulator.

8. An optical system comprising:

a first optical element; and a lens arranged at an enlargement side of the first optical element, wherein the first optical element has a first transmission surface, a first reflecting surface arranged at a reduction side of the first transmission surface, and a second transmission surface arranged at the reduction side of the first reflecting surface, the first transmission surface has positive power, light passing between the first transmission surface and the first reflecting surface includes peripheral light tilted in a direction of getting away from an enlargement-side conjugated plane as coming closer to the first transmission surface, the peripheral light is tilted in a direction of getting away from the enlargement-side conjugated plane as getting away from the first transmission surface between the first transmission surface and the lens, and the peripheral light is tilted in a direction of coming closer to the enlargement-side conjugated plane as getting away from the lens between the lens and the enlargement-side conjugated plane.

9. The optical system according to claim 8, wherein the first transmission surface has a rotationally symmetric convex shape centering on a first optical axis of the first transmission surface, and an imaginary line connecting a maximal effective point of the peripheral light on the first transmission surface and a curvature center of the first transmission surface intersects the first optical axis at an angle no smaller than 90°.

10. The optical system according to claim 9, wherein a second optical axis of the first reflecting surface and a third optical axis of the second transmission surface coincide with the first optical axis.

11. The optical system according to claim 10, wherein the first optical axis is perpendicular to the enlargement-side conjugated plane.

12. The optical system according to claim 9, wherein a fourth optical axis of the lens coincides with the first optical axis.

13. The optical system according to claim 8, further comprising:

a second optical element arranged at the reduction side of the first optical element; and a refracting optical system arranged at the reduction side of the second optical element, wherein the second optical element has a third transmission surface, a second reflecting surface arranged at the reduction side of the third transmission surface, and a fourth transmission surface arranged at the reduction side of the second reflecting surface, the second transmission surface and the third transmission surface are opposed to each other, and light emitted from a reduction-side conjugated plane enters the second transmission surface via the refracting optical system and the second optical element.

14. The optical system according to claim 13, wherein an angle formed between the first optical axis and an optical axis of the refracting optical system is no larger than 90°.

15. A projector comprising:

light modulator arranged on a reduction-side conjugated plane and configured to modulate light emitted from a light source; and the optical system according to claim 8 configured to project the light modulated by the light modulator.

\* \* \* \* \*